United States Patent Office 2,855,883
Patented Oct. 14, 1958

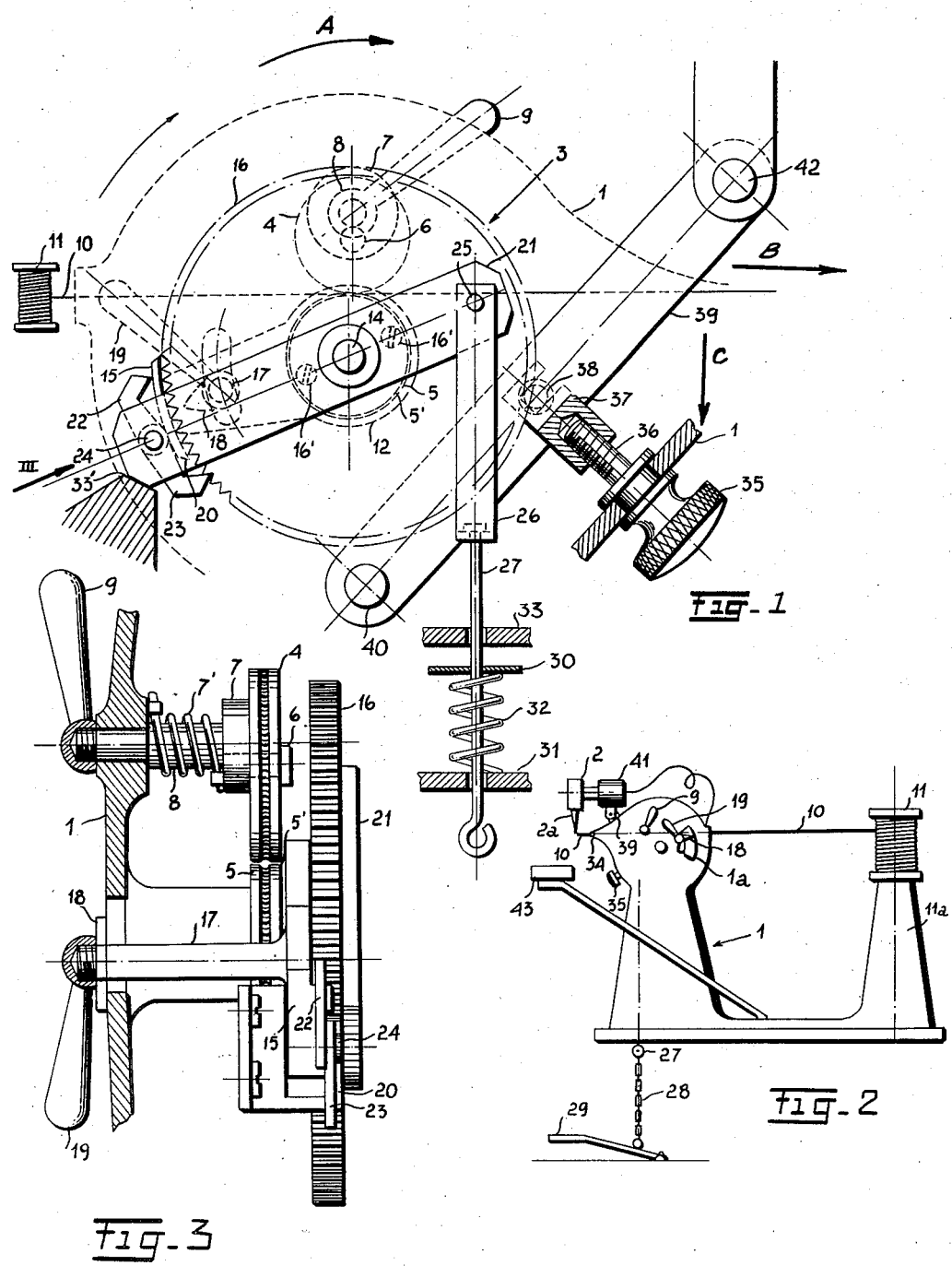

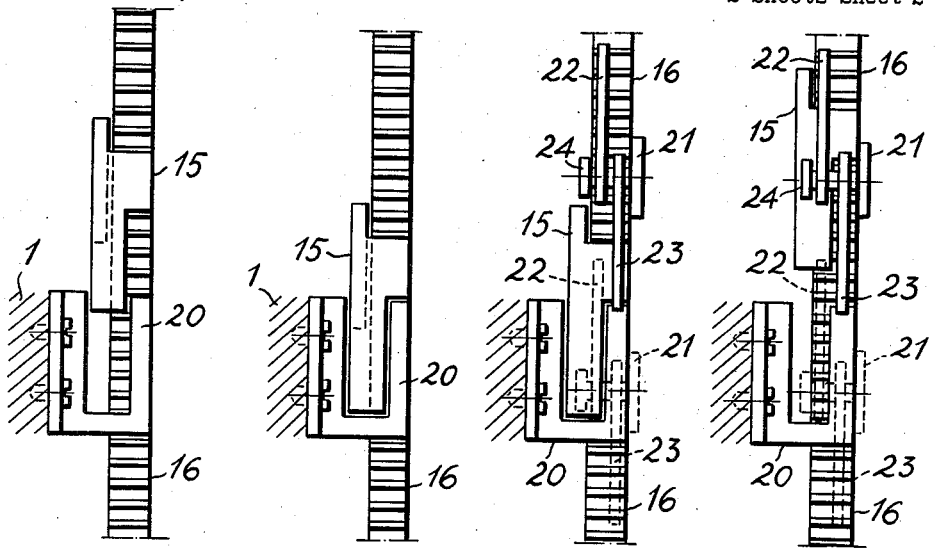
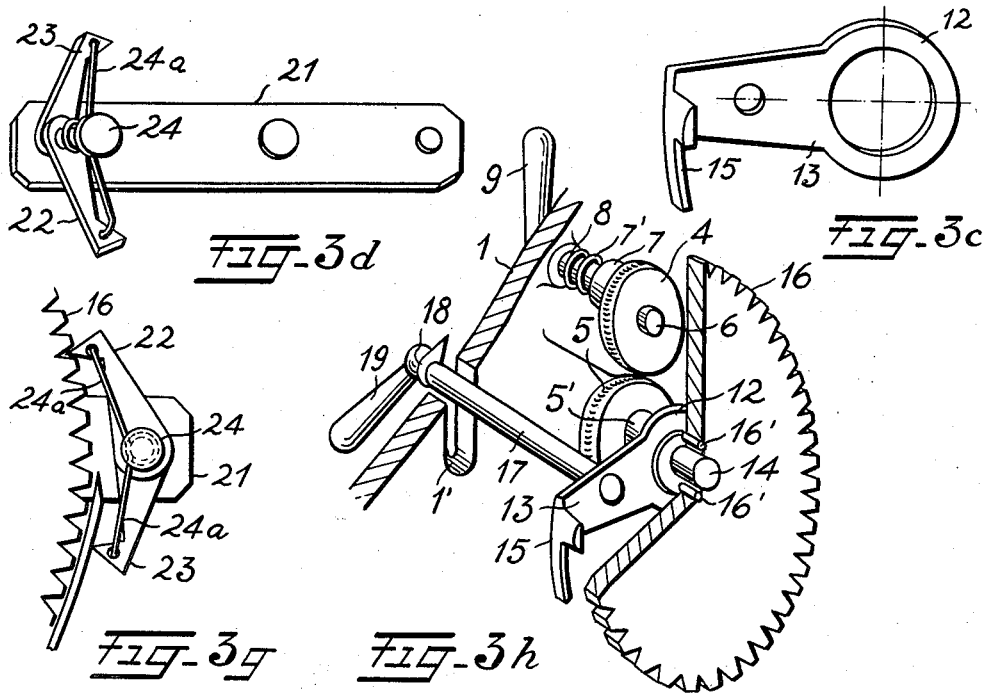

2,855,883

WELDING APPARATUS

Francesco Colombani and Lazzaro Fagnani, Milan, Italy

Application June 13, 1956, Serial No. 591,073

Claims priority, application Italy June 16, 1955

4 Claims. (Cl. 113—111)

The present invention relates to welding devices using tin wire and the like.

With particular reference to the field of radio and television manufacture, it is necessary to avoid the fatiguing of the welding operator so as to eliminate the resulting difficulties, but this object is not easy to achieve since the operator is compelled to handle, with one hand, the welding device and, with the other hand, the welding material.

Further, in order to reduce manufacturing costs, it is also desirable to avoid the waste of materials caused by the dropping of excessive welding material on zones adjoining the actual weld, and to reduce the working time required by eliminating the time lost due to the necessity of putting down the welding device after each welding operation.

Accordingly it is an object of the invention to provide a welding apparatus which avoids rapidly fatiguing the welding operator by eliminating the necessity of having the hands of the operator both engaged with the welding material and the welding device respectively.

Another object of the invention is the provision of a welding apparatus of the class described which permits dispensing measured quantities of welding material so as to avoid useless wastes thereof.

A further object of the invention is to provide a welding apparatus enabling the elimination of time lost in the handling of conventional welding apparatus, thus permitting increased productivity.

Another object of the invention is to provide mechanical means for controlling the dispensing of dosed quantities of welding material, which means are easy to operate and can cooperate with a welding member of conventional type.

These and other objects will be more particularly described with reference to the accompanying drawing, which is for illustrative purpose only, wherein:

Fig. 1 shows, diagrammatically, a side elevational and partly sectional view of a welding apparatus according to the preferred embodiment of the inventive concept (with parts thereof omitted to simplify the understanding), Fig. 2 shows, also diagrammatically, the welding apparatus of Fig. 1 turned 180° with respect to the view of Fig. 1, Fig. 3 is a rear view according to arrow III of Fig. 1 with certain parts thereof omitted, Fig. 3a and 3b are detail views showing diagrammatically two end positions of a movable plate, Fig. 3c shows diagrammatically the perspective view of an element of the apparatus, Fig. 3d shows diagrammatically a perspective view of other elements, Fig. 3e shows diagrammatically two end positions of the member of Fig. 3d when the movabe plate is located as in Fig. 3b, Fig. 3f shows diagrammatically two end positions of the member of Fig. 3d when the movable plate is located as in Fig. 3a.

Fig. 3g shows diagrammatically a detail of certain operative elements in engagement position, and Fig. 3h shows diagrammatically a perspective exploded view of the operative relationship between various elements with some parts broken away or omitted.

With reference to the drawing, the welding apparatus comprises a bearing frame 1, in which a conventional electrically heated welding member 2 and means 3 for feeding the device 2 with metered quantities of material, such as tin wire, are housed. More particularly said feeding means 3 are formed of a couple of rollers 4 and 5, the roller 4 being loosely mounted on an eccentrical pin 6 projecting from a disc 7 which is rigidly secured to a shaft 8 crossing the wall of frame 1. Between the disc 7 and the wall of the frame, a torsional spring 7' is arranged, said spring urging the roller 4 in the position shown in Fig. 1, i. e. in the lowest position by engaging a peg on disc 7. A lever 9 is secured to the end of shaft 8 which projects from the frame 1, said lever serving to lift roller 4 out of contact with the tin wire 10, fed by the bobbin 11, so as to allow the tin wire 10 to be introduced into the welding apparatus, at the beginning of the operation.

In order to enable rollers 4 and 5 to exert a sufficient entrainment section on wire 10, they may be knurled at their outer surfaces.

The cylinder 5, which is loosely mounted on the shaft 14, has a portion 5' of reduced diameter, so as to give rise to an annular abutment member, against which an annular end 12 of a member 13 adheres, said end being accordingly mounted on said portion 5'. The opposite end 15 of said member 13 forms a plate and is arranged so as to extend parallelly with respect to the periphery of a toothed wheel 16 and to cover a certain number of teeth of said toothed wheel.

On the middle part of the member 13, a rigidly fixed pin 17 projects through a slot 1' in the wall of frame 1, and carries at its free end an index 18. This end is threaded, so as to allow lever 19 to be screwed thereon, said lever serving to lock the member 13 in any desired position. A curved plate 20 is fixed to the frame 1 by means of screws permitting a slight adjustment, and extends also parallelly to the periphery of the toothed wheel 16 so as to cover a number of teeth of said toothed wheel. A slot as best seen in Fig. 3a is hollowed out in said plate 20, so as to receive therein the curved plate 15.

As it is manifest from this description, it will be possible to vary, by acting on pin 17 after having loosened lever 19, the number of teeth covered by the movable plate 15 and by the fixed plate 20.

It is to be noted that the plate 15 has a cross width corresponding to about half of the axial extension of the teeth of the wheel 16, whereas the plate 20 has also a width which is almost equal to that of plate 15, but is arranged to cover the complementary half of the teeth which is not covered by the plate 15.

The toothed wheel 16 is fixed to the roller 5,5' by means of two screws 16'. A lever 21 is pivoted on the axis 14 and is provided with two pawls 22 and 23, which are arranged in different planes and are pivoted around the pin 24 of the lever 21 and act in opposite directions on the teeth of the toothed wheel 16. Conventional springs 24a are provided so as to press the free end of the pawls 22, 23 against the toothed wheel 16. More particularly, pawl 22 is destined to be displaced on the plate 15, whereas the pawl 23 is displaced on the plate 20. A rod 26 is pivoted in 25 and is connected by means of an auxiliary rod 27 and a chain 28 to an operation pedal 29. Between a disc 30, rigidly mounted on said auxiliary rod 27 and a wall 31 of the frame 1, a compression spring 32 is arranged, which is aimed to bring the means generally indicated by reference numeral 3 to their original position. The frame 1 is provided with the abutment members 33 and 33', against which the rod 26 and the lever 21 respectively abut. More particularly, the abutment members 33' limits downwardly the travel of the rod 26, whereas the abutment member 33 limits the displacement of the lever 21 in the direction opposite to arrow A.

According to an inventive feature, the welding apparatus is completed by means allowing the welding device (welding member) to change its position with respect to the point 34 of feeding of the wire 10. Such means are formed of a handle 35 rotatably mounted in the wall of frame 1. A threaded extension 36 of said handle acts on a female threaded end of a rod 37, which is pivoted in member 38 to a lever 39, the latter being in turn pivoted on member 40 to the frame 1 and ending with a hole, in which a screw is inserted, which is destined to fasten the carrying element 41 of the welding device 2 to the lever 39. 1a is the scale associated with the index 18, whereas 2a is the heated welding projection of the welding member 2.

Assuming that the feeding means 3 are arranged as shown in Fig. 1, and that the tin wire 10 is coming out of the feeding member 34 without coming into contact with the heated projection 2a of the welding member 2, it will be convenient to act on element 13 so as to turn index 18 up to the graduation of the scale 1a which indicates the quantity of tin which is desired be fed to the welding zone, thus displacing the plate 15 so as to increase or to diminish the number of teeth corresponding to the rotation angle of the toothed wheel 16. To further explain this significant point of the invention, it is assumed that part 15 is displaced according to arrow A, i. e. so as to reduce the quantity of tin fed to the welding member 2. Thus the pawl 22 will be displaced on the plate 15, engaging with the toothed wheel only at the last part of its sliding travel. Contrariwise, with the displacing of the plate 15 in the opposite direction, the sliding travel of the pawl 22 on the plate 15 is reduced, so that the number of teeth or the angular displacement of the toothed wheel 16 is increased.

The pawl 23 is slidingly displaced on the fixed plate 20 and engages with the teeth of the toothed wheel only in the last portion of the return travel of the lever 21, so that the toothed wheel 16 and thus the wire 10 are slightly displaced in an opposite direction in respect to the arrows A and B. Such return displacement is smaller than the prior displacement and serves to space apart the wire 10 from the welding projection 2a of the welding device, as soon as the given quantity of tin to be dispensed is established.

All of these movements are obtained by acting on pedal 29 so as to displace the rod 26 in the sense of the arrow C. Such displacement causes the lever 21 to rotate according to arrow A.

When releasing pedal 29, the spring 32 brings the lever 21 into the position of Fig. 1, giving rise, as already stated, to the movement of the wire 10 in a direction opposite to arrow B.

In order to enable the engagement in both directions of the pawls with the toothed wheel, the cross section of the teeth have a triangular conformation. Furthermore, the welding apparatus is advantageously provided with a hand resting member 43 and with a vertical extension 11a for carrying bobbin 11. A switch is, in known manner, associated with the heating elements of the welding member 2.

There will now be obvious to those skilled in the art many modifications and variations utilizing the principle set forth and realizing any or all of the objections and advantages of the apparatus described, but which do not depart essentially from the spirit of the invention.

What is claimed is:

1. A welding apparatus comprising in combination: a welding member having a heated welding projection; dispensing means for feeding a controlled quantity of welding material to the heated welding projection; said dispensing means comprising at least a couple of rollers formed each of a first and second roller and arranged so as to exert an entrainment action on a wire forwarded across the meshing line of said rollers; a bobbin of welding wire arranged so as to feed said wire across the meshing line of said rollers; a frame for connecting and bearing both the welding member and the dispensing means; a central shaft extending from said frame, the first roller of said couple of rollers being loosely mounted on said central shaft; a toothed wheel rigidly fixed to said first roller and co-axial with said central shaft; a lever pivoted on said central shaft, the free end thereof being adapted to be actuated; spring means for returning said lever into its starting position after actuation; two parallel and oppositely extending pawls pivoted at the other end of said lever, the operative ends of which are arranged to engage with the teeth of said toothed wheel; first means stationarily fixed to said frame and second means rotatably mounted on said central shaft, both for covering at least a first portion and a second portion respectively of said teeth within the range of operation of said pawls on said teeth.

2. A welding apparatus as claimed in claim 1, wherein said first and said second means for covering at least a first and a second portion of said teeth comprises: a first plate fixed to the frame of the apparatus and covering one half of the axial width of a limited number of teeth; a second plate provided with an extension pivoted co-axially to said central shaft around a portion of said first roller having a reduced diameter; a lever; a pin projecting from said extension through a slot in said toothed wheel and being combined with said lever which is screwed on said pin so as to lock said extension in a desired angular position with respect to said toothed wheel, an index projecting from said extension so as to indicate on a scale on said wheel the amplitude of the angular adjusting displacements; said second plate covering the remaining half of the axial width of said teeth, each of said pawls being arranged to slidingly cooperate with one of said plates respectively.

3. A welding apparatus as claimed in claim 2, comprising a rod and chain system, a pedal, and a return spring and wherein the free end of said lever pivoted on said central shaft is linked to said rod and chain system combined with said pedal and influenced by said return spring acting against the operative movement of said lever.

4. A welding apparatus comprising in combination: a welding member having a heated welding projection; at least a couple of rollers formed each of a first and second roller and arranged so as to exert an entrainment action on a wire forwarded across the meshing line of said rollers; a bobbin of welding wire arranged so as to feed said wire across the meshing line of said rollers; a frame for connecting and bearing both the welding member and the dispensing means; means for imparting to at least one of said rollers a first active rotation of a given amplitude; spring means for imparting to said roller a reversal rotation; a pin; a disc; a lever; a shaft and a torsional spring; said second roller being loosely mounted on said pin which excentrically projects from said disc which is rigidly mounted on said shaft; said shaft being supported in said frame and driven by said lever which is rigidly secured to said shaft; said torsional spring being fixed at one end to said frame and at the other end with said shaft.

References Cited in the file of this patent

UNITED STATES PATENTS

| | | |
|---|---|---|
| 2,324,973 | Young | July 20, 1943 |
| 2,568,776 | Stull | Sept. 25, 1951 |
| 2,604,064 | Sefton | July 22, 1952 |
| 2,672,838 | Heidenreich et al. | Mar. 23, 1954 |
| 2,685,268 | Yeo et al. | Aug. 3, 1954 |